United States Patent
Anthony et al.

[11] Patent Number: 5,296,987
[45] Date of Patent: Mar. 22, 1994

[54] TAPERED CONDUCTORS FOR MAGNETORESISTIVE TRANSDUCERS

[75] Inventors: Thomas C. Anthony, Sunnyvale; James A. Brug, Menlo Park, both of Calif.

[73] Assignee: Hewlett-Packard Company, Palo Alto, Calif.

[21] Appl. No.: 894,389

[22] Filed: Jun. 5, 1992

[51] Int. Cl.$^5$ .............................................. G11B 5/127
[52] U.S. Cl. ...................... 360/113; 324/252
[58] Field of Search ............ 360/113; 338/32 R; 324/252

[56] References Cited

U.S. PATENT DOCUMENTS

| | | | |
|---|---|---|---|
| 3,860,965 | 1/1975 | Voegeli | 360/113 |
| 4,686,472 | 8/1987 | Van Ooijen | 360/113 |
| 4,782,414 | 11/1988 | Krounbi et al. | 360/113 |
| 4,803,580 | 2/1989 | Mowry | 360/113 |
| 4,814,918 | 3/1989 | Somers | 360/113 |
| 5,140,884 | 8/1992 | Maruyama | 360/113 |
| 5,168,409 | 12/1992 | Koyama | 360/113 |

OTHER PUBLICATIONS

R. J. Prosen et al., "Effect of Surface Roughness on Magnetic Properties of Films", Apr. 1963, J. of App. Phy., vol. 34, No. 4, pp. 1147–1148.

R. Minakata, "Magnetic Properties of Ni-Fe Films Prepared by a DC Triode Sputtering Method", May 1988, IEEE Trans. Mag., vol. 24, No. 3, pp. 2020–2023.

Primary Examiner—Louis J. Casaregola

[57] ABSTRACT

A method for reducing Barkhausen noise in dual stripe magnetoresistive recording heads. The topography of the bottom conductor is controlled, specifically the conductor sidewall angle at the edge of the track is defined to be less than 45° from the substrate plane. Restricting the conductor sidewall profile in this manner eliminates sources of magnetic domain nucleation.

8 Claims, 5 Drawing Sheets

TAPERED CONDUCTORS FOR MAGNETORESISTIVE TRANSDUCERS

BACKGROUND OF THE INVENTION

1. Technical Field

The present invention relates to magnetoresistive transducers. More particularly, the present invention relates to improved conductors for dual stripe magnetoresistive transducers.

2. Description of the Prior Art

Continuing advances in magnetic media technology allow increasing data storage densities. One active area of development is that of reading transducers. As such transducers are made smaller, data densities are increased. Magnetoresistive (MR) thin film technology has provided a particularly promising area of inquiry with regard to producing smaller reading transducers. In such technology, conductive thin films are formed on a substrate using techniques analogous to those of the semiconductor arts. Dual stripe MR transducers, such as are described in U.S. Pat. No. 3,860,965, issued to Voegeli, reflect the current state of the art.

The magnetic properties of ferromagnetic thin films used to produce MR transducers can be strongly influenced by the topographical features present on a transducer substrate. See, for example, *Effect of Surface Roughness on Magnetic Properties of Films*, Prosen et al, J. App. Phys., Vol. 34, No. 4 (1963); and *Magnetic Properties of Ni-Fe Films Prepared by a DC Triode Sputtering Method*, Minakata, IEEE Transactions on Magnetics, Vol. 24, No. 3 (1988). In particular, soft magnetic properties are affected when the height of such features is on the same order or greater than the thickness of the films, and such features have angles of departure from a substrate plane that are greater than a critical angle. The primary consequences of these sorts of features are local variations in anisotropy caused by magnetostriction, and local variations in film thickness caused by shadowing or angle of incidence considerations.

These non-uniformities serve as magnetic domain nucleation sites in ferromagnetic films. When present in magnetoresistive (MR) films such as are used to produce MR transducers, these magnetic domains transform a smoothly varying transducer output corresponding to resistance versus applied field into a sequence of irreproducible jumps associated with sudden movement of domain walls. Thus, an unacceptable level of noise, referred to as Barkhausen noise, is produced which degrades transducer performance. At track densities currently envisioned, there needs to be an improvement in the signal-to-noise ratio of MR transducers, as well as a mechanism for reducing and/or eliminating critical errors related to Barkhausen noise.

SUMMARY OF THE INVENTION

The present invention provides a method for reducing Barkhausen noise in dual stripe magnetoresistive recording heads by controlling the topography of the bottom conductor stripe. Specifically, the bottom conductor sidewall angle at the track edge of the conductor is defined to be less than 45° from the transducer substrate plane. Restricting the bottom conductor sidewall profile in this manner eliminates sources of magnetic domain nucleation, and results in reduction of Barkhausen noise.

Implementation of the present invention requires control of the patterning process of the bottom conductor in a dual stripe magnetoresistive transducer. There is no additional complexity added to the dual stripe structure. An additional benefit of the present invention is that the gently tapered conductor edge reduces the incidence of shorts between the two MR stripes. Thus, transducer yield and reliability are improved.

BRIEF DESCRIPTION OF THE DRAWINGS

FIG. 5b shows a magnetoresistive response curve from a shielded MR stripe produced in accordance with the edge profile shown in FIG. 5a;

FIG. 6b is a magnetoresistive response curve from a shielded MR stripe produced in accordance with the edge profile shown in FIG. 6a.

DETAILED DESCRIPTION OF THE INVENTION

Figure 1:
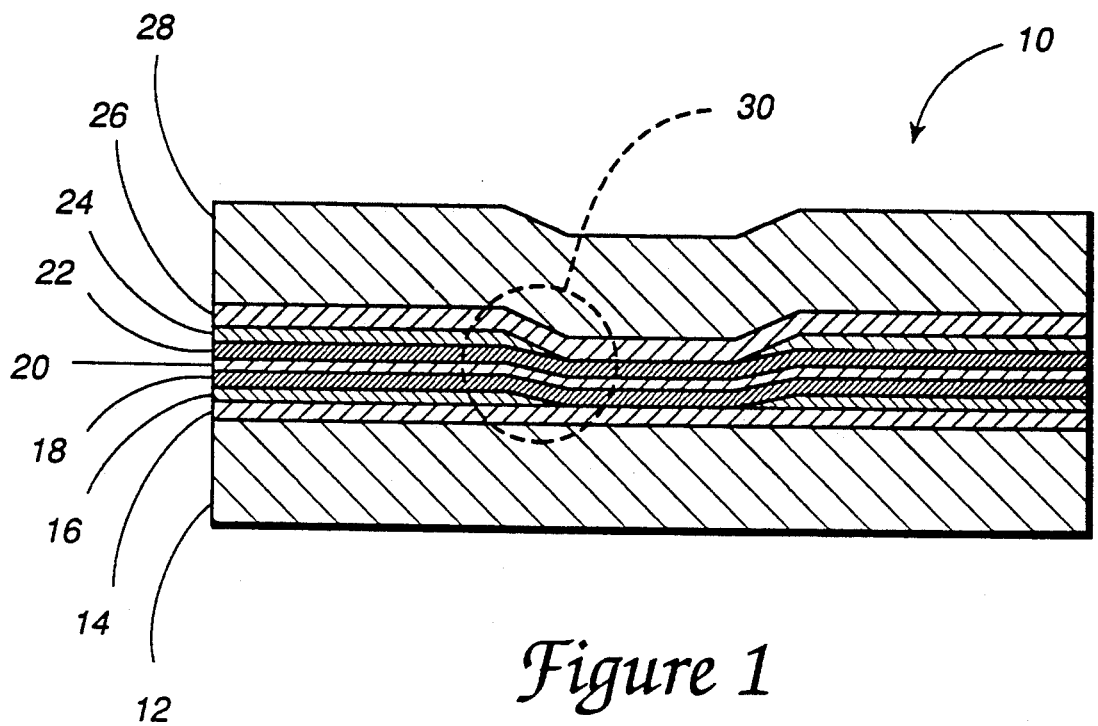
FIG. 1 is a sectional view of a dual stripe MR head in which both MR stripes traverse the topography of the bottom conductor.

The present invention is best understood by referring to the Drawings in connection with review of this Description. The present invention is a method for reducing the Barkhausen noise in dual stripe magnetoresistive (MR) heads through the proper control of topography in the head.

In a dual stripe MR head, at least one of the two MR elements must traverse the topography presented by the conductor that supplies current to the bottom MR stripe. It is generally recognized that soft magnetic films are sensitive to physical defects. Thus, the physical characteristics of the bottom conductor are important in relation to the ease of nucleation of magnetic domains in an MR film.

Figure 2:
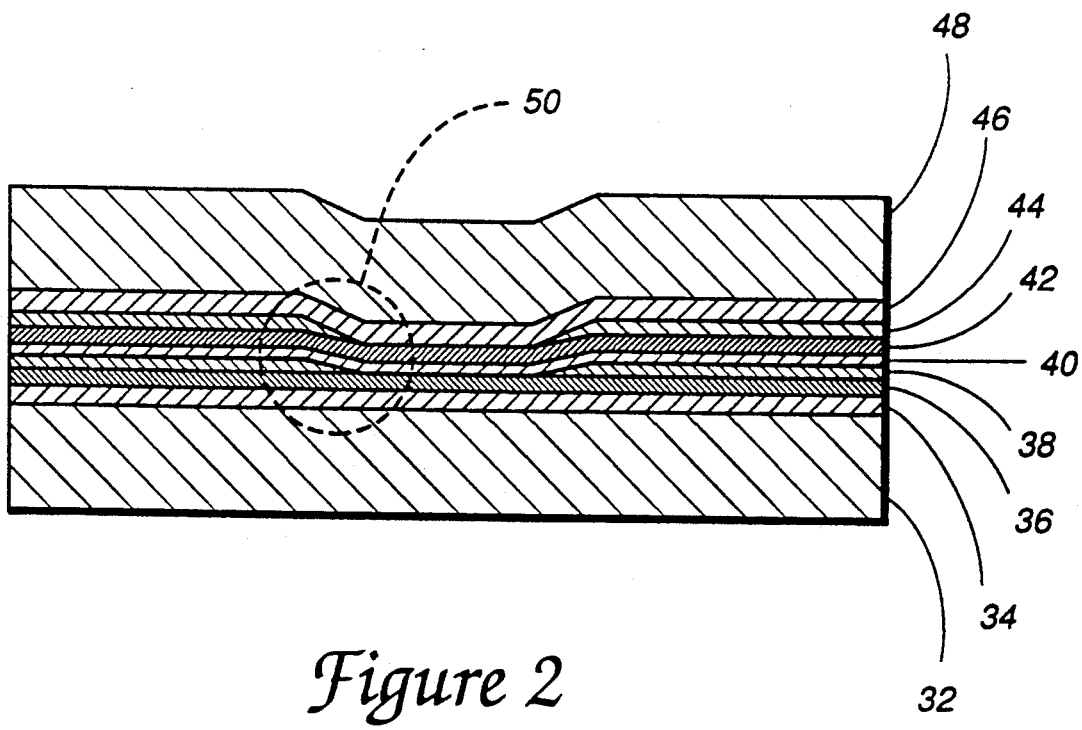
FIG. 2 is a sectional view of a dual stripe MR head in which only the top MR stripe traverses the topography of the bottom conductor.

FIGS. 1 and 2 illustrate two MR head configurations according the the preferred embodiments of the present invention. A dual stripe MR head structure is shown in section in FIG. 1 in which both MR stripes traverse the topography of the bottom conductor. In FIG. 1 an MR head structure 10 provides a substrate 12 (in the present example, a magnetic shield which is, itself, formed on a substrate) on which a first dielectric 14 is formed. A bottom conductor 16 is formed upon the dielectric and is arranged to provide a supply of current to a first MR stripe 18, which is formed upon the conductor. A second MR stripe 22 is formed over the first MR stripe and separated therefrom by a dielectric 20. A second conductor 24 provides current to the second MR stripe. The structure is completed by a shield 28 which is isolated from the second MR stripe by a dielectric 26.

It can be seen in the FIG. that both MR stripes 18,22 are formed above the first conductor 16 such that they traverse the topography of the conductor. The present invention provides a tapered bottom conductor having a sloping profile 30 and formed by a lift-off process, discussed below.

FIG. 2 shows a dual stripe MR head in cross section in which only the top MR stripe traverses the topography of the bottom conductor. In the FIG. a substrate 32 (which is a magnetic shield which is, itself, formed upon a substrate) is provided upon which a dielectric 34 is formed. A first MR stripe 36 is formed upon the dielectric. A first conductor 38 for providing current to the first MR stripe is formed on top of said stripe. The conductor is isolated from a second MR stripe 42 by a dielectric 40. The second MR stripe receives current from a second conductor 44. A shield 48, isolated from the second conductor by a dielectric 46, completes the structure.

It can be seen that only the top MR stripe traverses the bottom conductor topography. The present invention provides a tapered bottom conductor region 50 which provides a gradual slope upon which a second MR stripe is formed.

In accordance with the present invention, the steepness of the conductor side wall, as well as its cleanliness on a scale of tens of nanometers, is a crucial consideration in determining the magnetic stability of the dual stripe MR structure. In accordance with the teachings of the present invention, the side wall angle is preferably restricted to less than 45°. A clean conductor surface and sidewall is simultaneously provided. In this way, the adverse consequences of rapidly changing topography under the magnetoresistive film can be avoided.

Figure 3A:
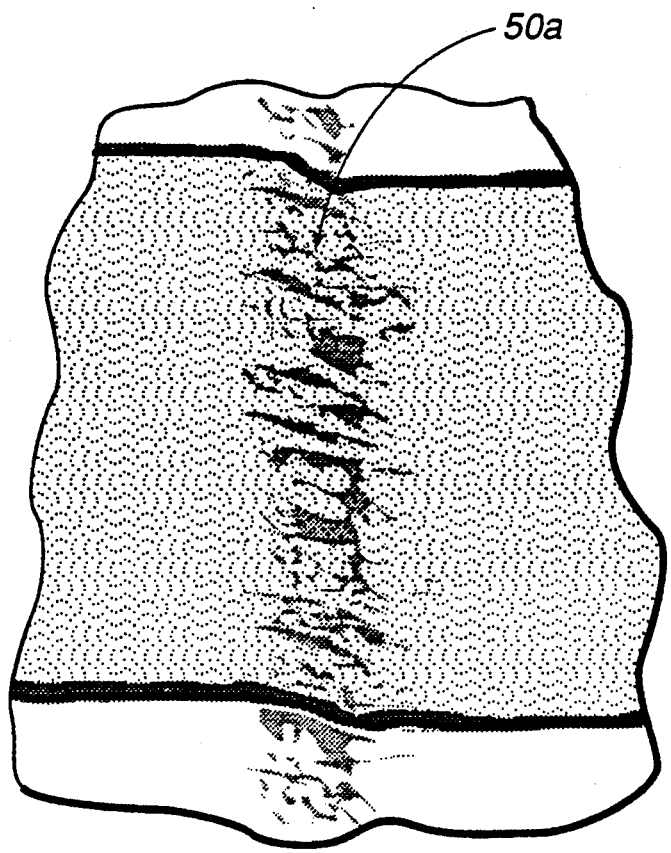
FIG. 3a shows a conductor topography having a ragged edge.
Figure 3B:
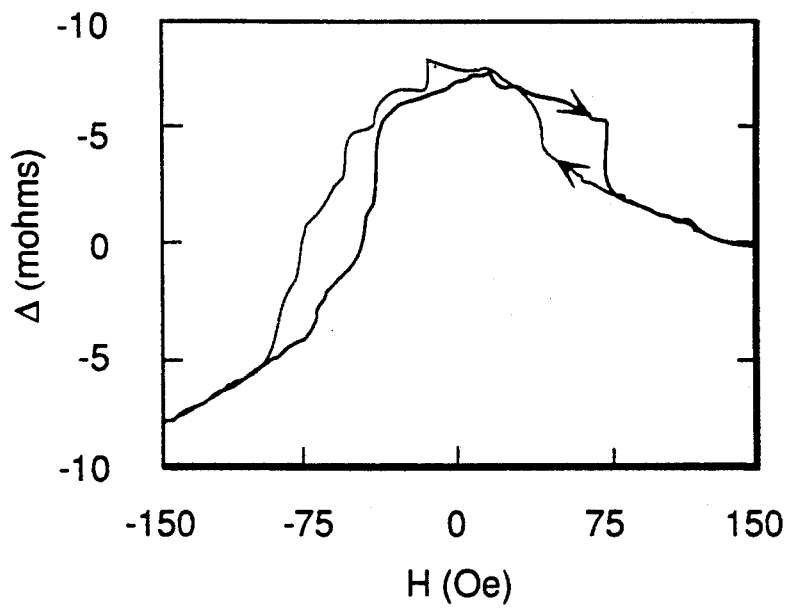
FIG. 3b shows a noisy magnetoresistive response curve which corresponds to a ragged conductor topography.

FIG. 3a shows an MR structure formed in accordance with prior art techniques. In the FIG. a ragged topography is evident along a bottom conductor edge 50a. In FIG. 3b, which shows a magnetoresistive response curve for the MR structure of FIG. 3a, resistance change in mohms is plotted against field. It can be seen from the curve that a ragged topography along a bottom conductor edge produces a magnetoresistive response curve exhibiting Barkhausen noise.

Figure 4A:
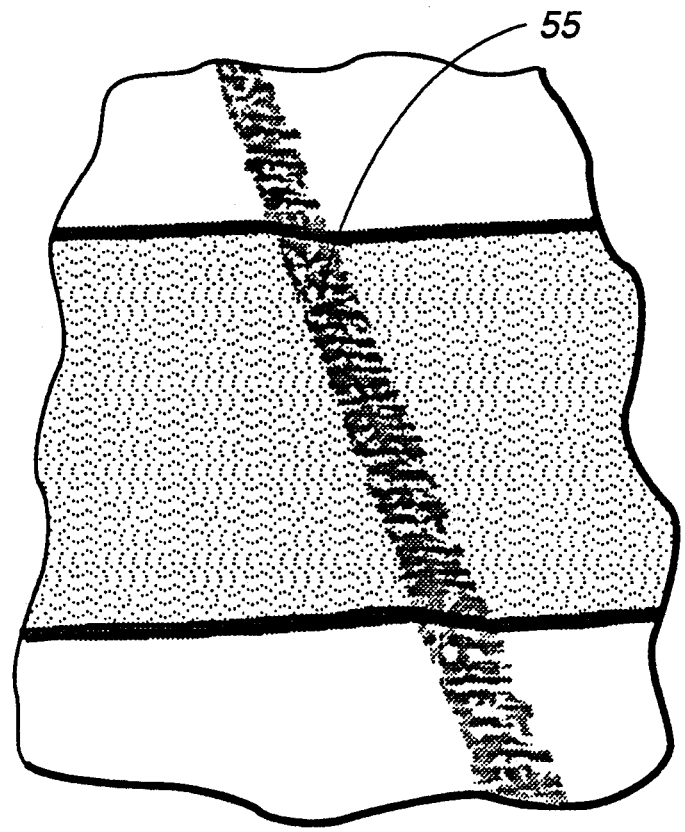
FIG. 4a shows a conductor topography having a smooth edge produced in accordance with the present invention.
Figure 4B:
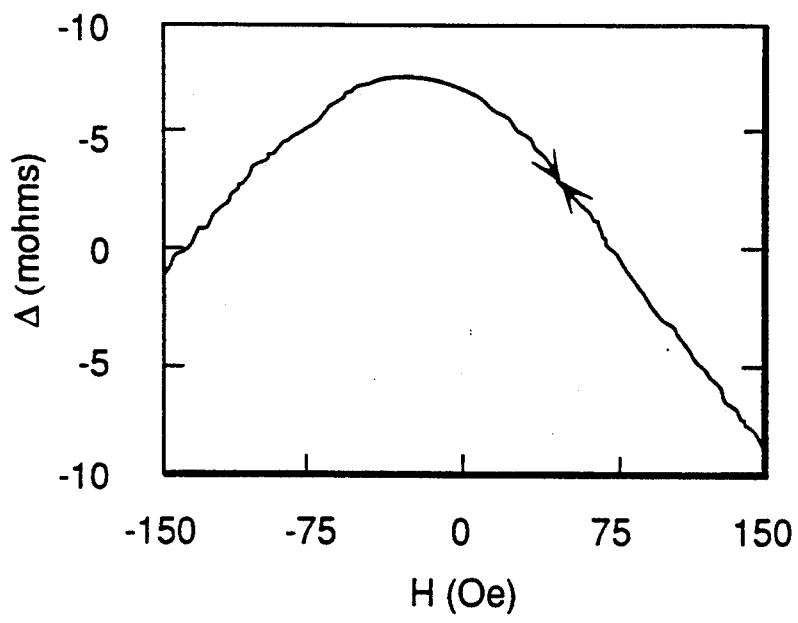
FIG. 4b shows a clean magnetoresistive response curve which corresponds to a smooth conductor topography produced in accordance with the present invention.

FIG. 4a shows an MR structure formed in accordance with the teachings of the present invention. In the FIG. a clean topography is evident along a bottom conductor edge 55. In FIG. 4b, which plots a magnetoresistive response curve for the structure of FIG. 4a, resistance change in mohms is plotted against field. It can be seen from the curve that a clean, gently sloping bottom conductor edge produces a magnetoresistive response curve that is free of Barkhausen noise.

In the preferred embodiment of the invention, the tapered edge of the bottom conductor is created through application of a lift-off process, in which the angle of incidence of the evaporated atom flux is constrained by an aperture. One such lift-off process as may be applied to the present invention is described in U.S. Pat. No. 4,803,580, issued to Mowry on 7 Feb. 1989. The angle of incidence, in conjunction with the thickness of the masking photoresist and the thicknesses of the deposited film, determines the taper angle on the bottom conductor.

Figure 5A:
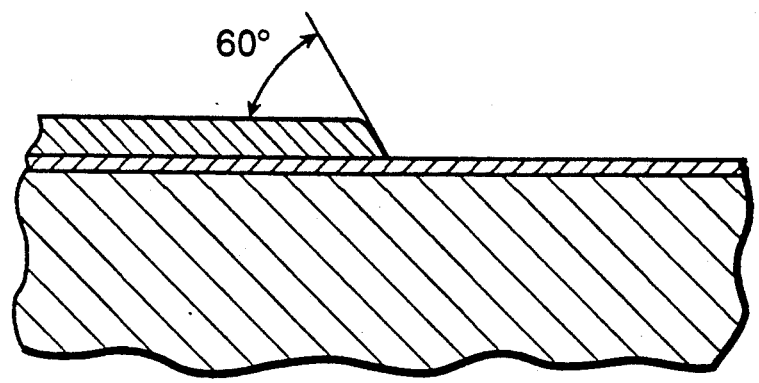
FIG. 5a is a cross sectional view of a conductor edge sloped at about 60° according to the present invention.
Figure 5B:
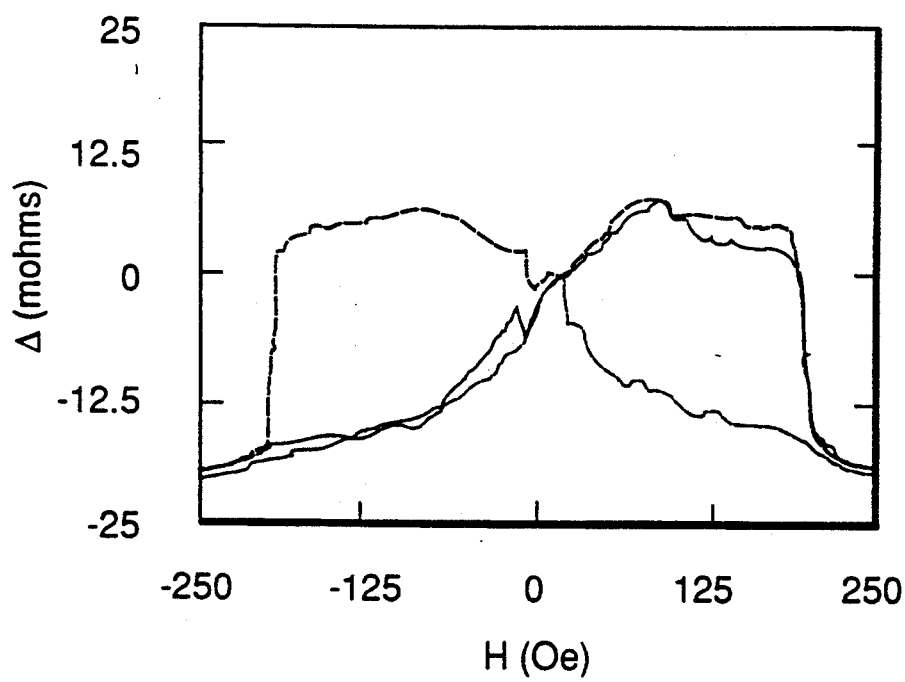
Figure 6A:
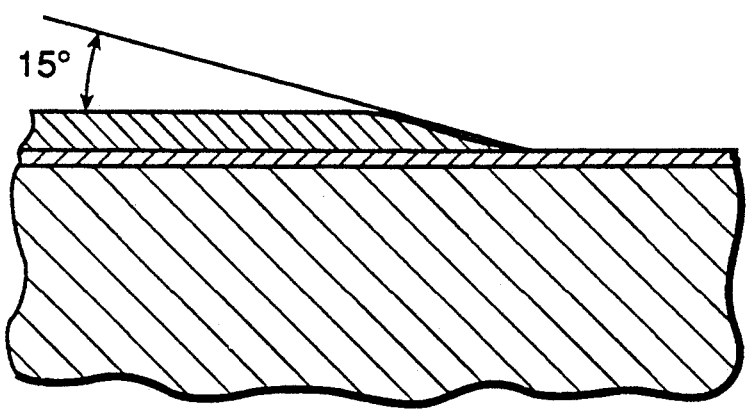
FIG. 6a is a cross sectional view of a conductor edge sloped at about 15° according to the present invention.
Figure 6B:
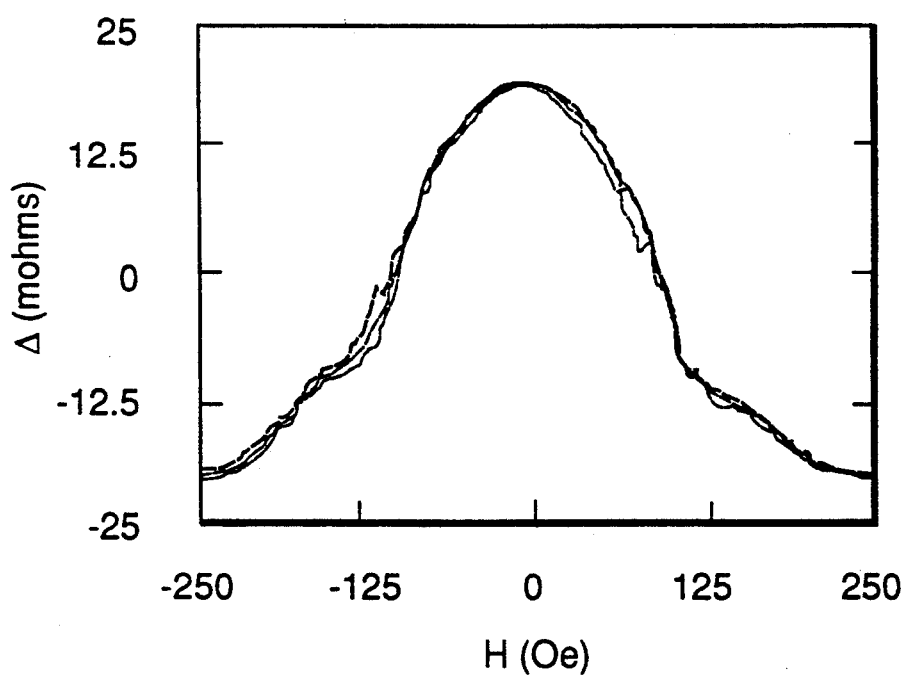

FIGS. 5a and 6a show sectional views of two extremes of conductor edge profiles that have been generated by the lift off method. Angles ranging from a shallow slope of 10° (e.g. as shown in FIG. 6a) to a steep slope of 65° (e.g. as shown in FIG. 5a), as measured from the plane of the substrate, have been produced in accordance with the teachings of the present invention. FIGS. 5b and 6b show response curves exhibited by shielded MR devices produced in accordance with the edge profiles shown in FIGS. 5a and 6a, respectively. As shown in FIG. 5b, the presence of the steep conductor edge introduces severe hysteresis into the MR response curve, whereas a non-hysteretic parabolic response curve is obtained, as shown in FIG. 6b, when an MR stripe is provided that traverses a gently sloped conductor edge.

Although the invention is described herein with reference to the preferred embodiment of the invention, one skilled in the art will readily appreciate that applications, other than may be substituted for those set forth herein without departing from the spirit and scope of the present invention. For example, while the lift off method is considered to be optimal for fabricating the tapered bottom conductor profile taught by the present invention, other methods may be employed. Accordingly, the invention should only be limited by the claims included below.

We claim:

1. In a magnetoresistive transducer, a method for reducing Barkhausen noise, comprising the step of:

forming a first conductor for supplying current to an associated magnetoresistive stripe, said magnetoresistive stripe being located above said conductor and traversing a conductor edge, said conductor having a tapered portion at an edge of a transducer track region, wherein said first conductor tapered portion is formed at an angle between about 10° and 65°, and preferably between about 15° and 45°, relative to a transducer substrate.

2. In a dual stripe magnetoresistive transducer, a method for reducing Barkhausen noise, comprising the step of:

forming a first conductor for supplying current to an associated magnetoresistive stripe which is formed above said conductor, said conductor having a tapered portion at an edge of a transducer track region, wherein said first conductor tapered portion is formed at an angle between about 10° and 65°, and preferably between about 15° and 45°, relative to a transducer substrate.

3. The method of claim 2, further comprising the step of:

forming a first and a second magnetoresistive stripe such that said stripes are situated above and traverse a topography produced by said first conductor.

4. The method of claim 2, further comprising the step of:

forming a first magnetoresistive stripe beneath said first conductor; and forming a second magnetoresistive stripe such that said second magnetoresistive stripe is situated above and traverses a topography produced by said first conductor.

5. A magnetoresistive transducer, comprising:

a first conductor for supplying current to an associated magnetoresistive stripe, said magnetoresistive stripe being situated above and traversing a conductor edge, said conductor having a tapered portion at an edge of a transducer track region, wherein said first conductor tapered portion is formed at an angle between about 10° and 65°, and preferably between about 15° and 45°, relative to a transducer substrate.

6. A dual stripe magnetoresistive transducer, comprising:

a first conductor for supplying current to an associated magnetoresistive stripe which is formed above said first conductor, said conductor having a tapered portion at an edge of a transducer track region, wherein said first conductor tapered portion is formed at an angle between about 10° and 65°, and preferably between about 15° and 45°, relative to a transducer substrate.

7. The transducer of claim 6, further comprising:

a first magnetoresistive stripe and a second magnetoresistive stripe, said stripes formed such that both stripes are situated above and traverse a topography produced by said first conductor.

8. The transducer of claim 6, further comprising:

a first magnetoresistive stripe formed beneath said first conductor; and a second magnetoresistive stripe formed such that said second magnetoresistive stripe is situated above and traverses a topography produced by said first conductor.

* * * * *